United States Patent
Asami et al.

(10) Patent No.: US 6,887,921 B2
(45) Date of Patent: May 3, 2005

(54) INK FOLLOWER COMPOSITION FOR WRITING INSTRUMENTS, AND PROCESS FOR ITS PRODUCTION

(75) Inventors: Hideaki Asami, Owariasahi (JP); Youichi Takasu, Kasugai (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 374 days.

(21) Appl. No.: 10/123,259

(22) Filed: Apr. 17, 2002

(65) Prior Publication Data

US 2003/0200896 A1 Oct. 30, 2003

(51) Int. Cl.$^7$ .............................. C09D 11/00; B43K 7/08
(52) U.S. Cl. ..................... 523/161; 401/142; 106/31.13
(58) Field of Search ...................... 401/142; 106/31.13; 523/161

(56) References Cited

U.S. PATENT DOCUMENTS 5,560,765 A * 10/1996 Sawada ..................... 106/31.3
6,012,864 A    1/2000  Asami ........................ 401/142
6,200,053 B1   3/2001  Asami et al. ................ 401/142

FOREIGN PATENT DOCUMENTS

| JP | 6-47318   | 6/1994 |
| JP | 11-165486 | 6/1999 |
| JP | 11-170757 | 6/1999 |

* cited by examiner

*Primary Examiner*—Robert D. Harlan
(74) *Attorney, Agent, or Firm*—Fitzpatrick, Cella, Harper & Scinto

(57) ABSTRACT

An ink follower composition to be provided at the rear end of an ink held directly in an ink container of a writing instrument and capable of going forward with consumption of the ink. The composition comprises at least one selected from an ethylene-α-olefin co-oligomer, an α-olefin oil, a purified mineral oil and a polybutene, and added thereto a specific fatty acid amide. This composition can simultaneously satisfy the two important performances conflicting with each other, the ink flow-back preventive performance and the ink follow-up performance.

10 Claims, No Drawings

INK FOLLOWER COMPOSITION FOR WRITING INSTRUMENTS, AND PROCESS FOR ITS PRODUCTION

The disclosures of Japanese Application No. 2000-175110 is hereby incorporated by reference.

BACKGROUND OF THE INVENTION

1. Field of the Invention

This invention relates to an ink follower composition for writing instruments, and a process for its production. More particularly, it relates to an ink follower composition for writing instruments which is a highly viscous fluid provided at the rear end of an ink held in an ink container (tubular ink reservoir) and capable of going forward with consumption of the ink, and a process for its production.

2. Related Background Art

As writing instruments having structure that an ink with which the interior of a pipe-like ink container is filled is led out directly to a pen-tip without being passed through any ink feeder or the like, oil-based ink ballpoint pens are conventionally in general use. The ink applied to the oil-based ink ballpoint pen of this type is an ink having a high viscosity of from thousands to tens of thousands of mPa·s. Because of such a high viscosity, a high writing pressure has been required to be applied for writing. In recent years, water-based ink ballpoint pens comprising combination of the structure of such an oil-based ink ballpoint pen with a water-based ink having a medium viscosity (tens to hundreds of mPa·s) have come into wide use.

The water-based ink of this type has a lower viscosity than the oil-based ink, and may require light writing pressure for writing. It, however, has a disadvantage that because of its low viscosity the ink tends to flow out toward the rear end of the ink container. Accordingly, it is usually indispensable to provide at the rear end of the ink in the ink container an ink follower which is a highly viscous fluid.

The ink follower is chiefly required to have two performances conflicting with each other, the performance of preventing the ink from flowing back (ink flow-back preventive performance) and the performance of follow-up moving together with ink with consumption of the ink to ensure smooth writing (ink follow-up performance). Making the ink follower hard in order to improve the ink flow-back preventive performance may make the ink follow-up performance poor, and making the ink follower soft in order to improve the ink follow-up performance may cause the flow-back of ink with ease.

For the purpose of providing ink follower having these required performances, proposals have been made in variety. For example, Japanese Patent Publication No. 6-47318 discloses an ink follower comprised of liquid polybutene as a base oil and having been thickened with fine-particle silica, metal soap, bentonite or the like. Japanese Patent Applications Laid-Open No. 11-165486 and No. 11-170757 also disclose an ink follower comprised of silicone oil as a base oil and having been thickened with fine-particle silica, benzylidene sorbitol, an amino acid derivative or the like.

In the former of these conventional ink follower, the liquid polybutene used as a base oil has a high affinity for ink components such as dyes, surface-active agents, various additives and so forth, and hence part of the ink follower may migrate into the ink or some component of the ink may migrate into the ink follower, so that the ink follower or the ink may change in physical properties to tend to cause problems such as a lowering of ink flow-back preventive performance, a change in properties of ink, and a change in color of ink.

In the case of the latter ink follower comprised of silicone oil as a base oil, its viscosity may greatly lower when a shear force is applied, and it takes a long time until the original viscosity is restored after the shear force has been taken away. Moreover, where the ink follower is stored over a long period of time, its gel strength may gradually lower to make any sufficient ink flow-back preventive performance not achievable, and there has been a possibility of causing difficulties such as leak of ink when ballpoint pens are left with their nibs up (erect) or undergo a shock.

SUMMARY OF THE INVENTION

The present invention is to eliminate such difficulties the conventional ink followers have involved. Accordingly, an object of the present invention is to provide an ink follower which, even where a base oil having a high affinity for ink components is used, does not cause any deterioration, change in properties or change in color of the ink follower and ink due to the mutual action between the ink and the ink follower, and moreover may less cause changes in physical properties due to shear force and long-term storage and has superior ink follow-up performance and ink flow-back preventive performance.

In the present specification, "front" is descriptive of the pen-tip side, and "rear" the ink follower side, and also, "erect" the state of a pen with its pen-tip up, and "inverted" the state of a pen with its pen-tip down.

The present inventors have investigated combination of various base oils with various thickening agents to make studies on an ink follower which can satisfy the ink follow-up performance and the ink flow-back preventive performance simultaneously and also can maintain the initial performances even when shocked or long-term stored. As the result, they have accomplished the present invention.

That is, the present invention provides an ink follower composition to be provided at the rear end of an ink held directly in an ink container of a writing instrument and capable of going forward with consumption of the ink; the composition comprising at least one slightly volatile solvent selected from an ethylene-α-olefin co-oligomer, an α-olefin oil, a purified mineral oil and a polybutene, and added thereto a fatty acid amide represented by the following Formula (1) or (2).

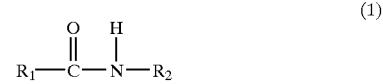

(1)

wherein $R_1$ represents a saturated fatty acid, unsaturated fatty acid or hydroxyl fatty acid having 8 to 22 carbon atoms, and $R_2$ represents an alkyl group, alkenyl group or cycloalkyl-substituted alkyl group having 8 to 22 carbon atoms.

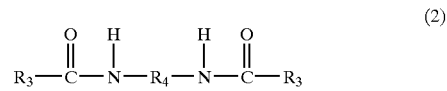

(2)

wherein $R_3$ represents a saturated fatty acid, unsaturated fatty acid or hydroxyl fatty acid having 8 to 22 carbon atoms, and $R_4$ represents $-(CH_2)_n-$, where n represents an integer of 1 to 8.

At least one of the fatty acid amide may be added in an amount of from 0.2 to 3.0% by weight based on the total weight of the ink follower composition.

The ink follower composition may be produced by previously making the fatty acid amide dissolve or swell in at least one organic solvent selected from an aromatic hydrocarbon, an aliphatic hydrocarbon, a ketone, an ester, a glycol ether and a lower aliphatic alcohol, followed by mixing with at least one slightly volatile solvent selected from an ethylene-α-olefin co-oligomer, an α-olefin oil, a purified mineral oil and a polybutene.

DESCRIPTION OF THE PREFERRED EMBODIMENTS

In the present invention, the slightly volatile solvent, which is used as the base oil, is selected from an ethylene-α-olefin co-oligomer, an α-olefin oil, a purified mineral oil and a polybutene.

The fatty acid amide, which is added as a thickening agent, is the compound represented by the above Formula (1) or (2). In the compound represented by Formula (1), as examples of the compound wherein the $R_2$ in the formula is hydrogen, it may include lauric acid amide, stearic acid amide, oleic acid amide, erucic acid amide, ricinolic acid amide and 12-hydroxystearic acid amide. Also, as examples of the compound wherein the $R_2$ in the formula is an alkyl group or alkenyl group, it may include N-isobutyl lauric acid amide, N-isobutyl stearic acid amide, N-oleyl stearic acid amide, N-oleyl oleic acid amide, N-stearyl stearic acid amide, N-stearyl oleic acid amide, N-oleyl palmitic acid amide and N-stearyl erucic acid amide.

In the compound represented by Formula (1), the compound wherein the $R_2$ in the formula is cycloalkyl-substituted alkyl group, may be exemplified by N-cyclohexyl methyl lauric acid amide and N-cyclohexyl methyl caproic acid amide.

As examples of the compound represented by Formula (2), it may include N,N'-ethylene bislauric acid amide, N,N'-methylene bisstearic acid amide, N,N'-ethylene bisstearic acid amide, N,N'-ethylene bisoleic acid amide, N,N'-ethylene bisbehenic acid amide, N,N'-ethylene bis-12-hydroxystearic acid amide, N,N'-butylene bisstearic acid amide, N,N'-hexamethylene bisstearic acid amide and N,N'-hexamethylene bisoleic acid amide.

At least one of these fatty acid amides may be added in an amount of from 0.2 to 3.0% by weight based on the total weight of the ink follower composition, to obtain the ink follower composition of the present invention. If it is added in an amount smaller than 0.2% by weight, the ink follower composition obtained may have an insufficient viscosity to cause difficulties such that the ink follower may move toward the rear end of the ink container when the writing instrument is left to stand erect or that the ink follower or the ink may flow out or splash when the writing instrument is dropped standing erect.

If on the other hand the fatty acid amide is added in an amount larger than 3% by weight, the resultant ink follower may be so excessively hard that its follow-up action toward the pen-tip with consumption of the ink at the time of writing may be hindered, so that the ink may insufficiently be supplied to cause a lowering of handwriting density or a breaking-off of writing lines.

The fatty acid amide may preferably be added in an amount of from 0.2 to 3.0% by weight, and may more preferably be added in an amount of from 0.5 to 2.0% by weight.

The chief components of the ink follower composition of the present invention are, as described previously, at least one selected from an ethylene-α-olefin co-oligomer, an α-olefin oil, a purified mineral oil and a polybutene and the fatty acid amide described above. In order to make the gel strength much higher, it is also effective to add fine-particle silica (hydrophilic or hydrophobic), benzylidene sorbitol, amino acid derivative, bentonite, swellable mica or the like in a small quantity as an auxiliary thickening agent.

As a viscosity modifier, atactic polypropylene or ethylene-α-olefin resin may also be added.

The fatty acid amide used in the ink follower composition of the present invention has a low affinity for the ethylene-α-olefin co-oligomer, α-olefin oil, purified mineral oil or polybutene used as the base oil, and hence it is difficult to obtain a good dispersion if these are only simply stirred. Accordingly, it is preferable to use a production process comprising previously making the fatty acid amide dissolve or swell with heating, in a low-boiling solvent such as xylene, mineral spirit, methyl isobutyl ketone or ethyl alcohol in a concentration of from 10 to 20% by weight to prepare a fatty acid amide paste, and introducing the fatty acid amide paste into a base oil, which are then preliminarily stirred by means of a Disper or the like, followed by dispersion by means of a three-roll mill. Here, the three-roll mill dispersion is carried out in an open state, and hence the low-boiling solvent used to prepare the paste volatilizes before the dispersion treatment is completed.

As the low-boiling solvent, a solvent having a high dissolving power for the fatty acid amide to be used may be selected. Stated specifically, a solvent, or a mixed solvent of two or more, selected from aliphatic hydrocarbon such as mineral spirit, aromatic hydrocarbons such as toluene and xylene, ketones such as methyl ethyl ketone and methyl isobutyl ketone, lower alcohols such as ethyl alcohol, isopropyl alcohol and n-butyl alcohol, and esters such as ethyl acetate and butyl acetate, glycol ether such as ethyleneglycol mono butyl ether may be used.

Into the solvent or mixed solvent thus selected, the fatty acid amide may be introduced in an amount of from 10 to 20% by weight of the total weight of the composition, and these may be stirred at a temperature of from 75 to 120° C. in a flask having a reflux condenser, to obtain the fatty acid amide paste.

The fatty acid amide paste thus obtained and at least one selected from an ethylene-α-olefin co-oligomer, an α-olefin oil, a purified mineral oil and a polybutene may be mixed in stated quantity, and the mixture may preliminarily be stirred, followed by the three-roll mill treatment to obtain the ink follower composition of the present invention.

Its production by the above production process enables the fatty acid amide to be uniformly dispersed in the base oil in the state of fine particles to form a fine three-dimensional network structure. Hence, a good ink follower composition can be obtained which has high thixotropic properties, does not show any abrupt lowering of viscosity even when a shear force is applied, and also may cause any separation or the like of the oil component even when stored over a long period of time, retaining a gel state which is stable with time.

EXAMPLES

The ink follower composition for writing instruments according to the present invention is described below by giving Examples and Comparative Examples.

Preparation of Fatty Acid Amide Paste

Fatty Acid Amide Paste A:

15 parts by weight of ethyl alcohol, 65 parts by weight of xylol and 20 parts by weight of N-cyclohexyl methyl lauric acid amide were put into a flask having a reflux condenser, and were stirred at 105° C. until a uniform mixture was formed, followed by cooling at room temperature to obtain a fatty acid amide paste A.

Fatty Acid Amide Paste B:

90 parts by weight of mineral spirit and 10 parts by weight of N-isobutyl lauric acid amide were put into a flask having a reflux condenser, and were stirred at 120° C. until a uniform mixture was formed, followed by cooling at room temperature to obtain a fatty acid amide paste B.

Fatty Acid Amide Paste C:

25 parts by weight of ethyl alcohol, 65 parts by weight of xylol and 10 parts by weight of N-stearyl lauric acid amide were put into a flask having a reflux condenser, and were stirred at 105° C. until a uniform mixture was formed, followed by cooling at room temperature to obtain a fatty acid amide paste C.

Examples 1 to 5 &

Comparative Examples 1 to 6

Ink follower compositions of Examples and Comparative Examples were produced under formulation shown in Tables 1 and 2, respectively. In the tables, numerical values for each component indicate parts by weight.

In Examples 1 to 5 and Comparative Examples 1 and 2, the fatty acid amide paste was introduced into the base oil in the stated quantity, which were then preliminarily stirred, followed by three-roll mill treatment to obtain the ink follower composition.

In Comparative Examples 3 to 6, a gelling agent was introduced in the base oil in the stated quantity, which were then heated with stirring by means of a Disper. At the time the temperature reached 140° C., the stirring and heating were stopped, followed by natural cooling to room temperature to obtain the ink follower composition.

Hardness of each ink follower composition of Examples and Comparative Example was measured with a spreadmeter, and its measured value is shown in the item of "SM value" in the tables.

In Comparative Example 5, however, the composition was unable to be thickened with the gelling agent to have substantially the same viscosity as the base oil, and hence it was omitted from those on which the measurement with the spreadmeter and the performance test were made.

TABLE 1

| Materials | Remarks | Example | | | | |
|---|---|---|---|---|---|---|
| | | 1 | 2 | 3 | 4 | 5 |
| Polybutene 3SH: | (1) | 94 | 92 | — | — | 90 |
| LUCANT HC-150: | (2) | — | — | 90 | 92 | — |
| Fatty acid amide paste A: | | 6 | — | 10 | — | — |
| Fatty acid amide paste B: | | — | 8 | — | 8 | — |
| Fatty acid amide paste C: | | — | — | — | — | 10 |
| SM value: | | 4.3 | 46 | 34 | 46 | 44 |

TABLE 2

| Materials | Remarks | Comparative Example | | | | | |
|---|---|---|---|---|---|---|---|
| | | 1 | 2 | 3 | 4 | 5 | 6 |
| Polybutene 3SH: | (1) | 99 | 84 | 99 | — | — | — |
| LUCANT HC-150: | (2) | — | — | — | 99 | 98 | 99 |
| Fatty acid amide paste A: | | 1 | 16 | — | — | — | — |
| Fatty acid amide paste B: | | — | — | — | — | — | — |
| Gel All D: | (3) | — | — | 1 | 1 | — | — |
| Aluminum stearate: | | — | — | — | — | 2 | — |
| GP-1: | (4) | — | — | — | — | — | 1 |
| SM value: | | ≧50 | 27 | 30 | 34 | — | 30 |

The materials listed in the tables and numbered as remarks are described below.

(1) Polybutene 3SH:

Available from NOF Corporation; liquid polybutene; average molecular weight: 720; viscosity: 2,100 cSt (40° C.).

(2) LUCANT HC-150:

Available from Mitsui Petrochemical Industries, Ltd.; an ethylene-α-olefin co-oligomer; viscosity: 2,200 cSt (40° C.).

(3) Gel All D:

Available from New Japan Chemical Co., Ltd.; dibenzylidene sorbitol.

(4) GP-1:

Available from Ajinomoto Co., Inc.; acylated amino acid.

Preparation of sample ballpoint pens:

A polyethylene tube of 3.8 mm in inner diameter to one end of which a stainless-steel pipe pen-tip having a hard-metal ball of 0.7 mm in diameter had been set was filled with a water-based black ink having a viscosity of 100 mPa·s at 20° C., and the ink follower compositions of Examples and Comparative Examples were each provided at its rear end in contact therewith to prepare sample ballpoint pens. These were put to the following performance tests.

Ink Flow-back Test

The above sample ballpoint pens were dropped at a height of 4 feet as they were kept standing erect, and how the ink followers came to stand was visually observed.

Ink Follow-up Performance Test

Writing was tested on the sample ballpoint pens under conditions of a writing load of 100 g and a writing speed of 10 m/minute.

Shear Force Resistance Test

The ink follower compositions of Examples and Comparative Examples were stirred at 1,500 rpm for 5 minutes by means of a Disper. Immediately thereafter, ballpoint pens were assembled using the above component parts and ink, and the same ink flow-back test as the above was made.

Base Oil Separation Test

The sample ballpoint pens were left in an atmosphere of 50° C. for a month as they were kept standing erect. Thereafter, how the ink followers came to stand was visually observed.

The results of the tests thus made are shown in Table 3 below. Also, evaluation criteria in the respective tests are as follows:

Ink Flow-back Test

A: The ink follower stands unchanged.
B: The ink follower has lost its shape.
C: The ink follower has lost its shape and the ink has leaked rearward.

Ink Follow-up Performance Test

A: Writing can well be done.
B: Writing lines have blurred.
C: Writing lines break off, or writing can not be done.

Shear Force Resistance Test

A: The ink follower stands unchanged.
B: The ink follower has lost its shape.
C: The ink follower has lost its shape and the ink has leaked rearward.

Base Oil Separation Test

A: The ink follower stands unchanged.
B: The ink follower has separated partly and migrated into the ink.
C: The ink follower has separated partly and migrated up to the pen-tip.

TABLE 3

| | Ink flow-back test | Ink flow-up test | Shear force resistance test | Base oil separation test |
|---|---|---|---|---|
| | Example: | | | |
| 1 | A | A | A | A |
| 2 | A | A | A | A |
| 3 | A | A | A | A |
| 4 | A | A | A | A |
| 5 | A | A | A | A |
| | Comparative Example: | | | |
| 1 | C | A | A | B |
| 2 | A | C | A | A |
| 3 | C | B | B | B |
| 4 | A | A | B | C |
| 5 | — | — | — | — |
| 6 | A | A | B | B |

As described above, the ink follower composition of the present invention has characteristic features that it can simultaneously satisfy the two important performances conflicting with each other, the ink flow-back preventive performance and the ink follow-up performance, and also does not cause any change in hardness or separation of base oil during storage. It also does not cause any remarkable lowering of viscosity even when shear force is applied in the step of fitting it to ink containers, and can immediately return to the original viscosity after the shear force has been taken away. Hence, it does not cause any difficulties such as leak of ink also in the steps of manufacturing writing instruments.

What is claimed is:

1. A composition comprising:
   (i) at least one oil selected from the group consisting of an ethylene-α-olefin co-oligomer, an α-olefin oil, a purified mineral oil and a polybutene, and (ii) at least one a fatty acid amide represented by Formulae (1) or (2):

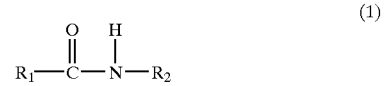

wherein $R_1$ represents a saturated fatty acid, unsaturated fatty acid or hydroxyl fatty acid having 8 to 22 carbon atoms, and $R_2$ represents an alkyl group, alkenyl group or cycloalkyl-substituted alkyl group having 8 to 22 carbon atoms, or

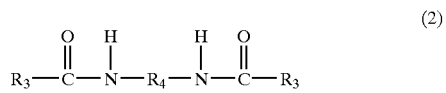

wherein $R_3$ independently represents a saturated fatty acid, unsaturated fatty acid or hydroxyl fatty acid having 8 to 22 carbon atoms, and $R_4$ represents —$(CH_2)_n$—, where n represents an integer of 1 to 8 wherein, when provided in contact at the distal end of an ink held in an ink container of a writing instrument, is capable of moving forward with consumption of said ink while maintaining contact therewith.

2. The composition according to claim 1, wherein said fatty acid amide is present in an amount of from 0.2% by weight to 3.0% by weight based on total weight.

3. A process for producing the composition according to claim 1 or 2, comprising:
   (A) placing the fatty acid amide in at least one organic solvent selected from the group consisting of an aromatic hydrocarbon, an aliphatic hydrocarbon, a ketone, an ester, a glycol ether and a lower aliphatic alcohol, and
   (B) adding to said organic solvent at least one material selected from the group consisting of an ethylene-α-olefin co-oligomer, an α-olefin oil, a purified mineral oil and a polybutene.

4. The process of claim 3, wherein said fatty acid amide dissolves in said organic solvent in step (A).

5. The process of claim 3, wherein said fatty acid amide swells in said organic solvent in step (A).

6. The composition according to claim 1 or 2, wherein both $R_3$'s in Formula (2) are identical.

7. The composition according to claim 1 or 2, which consists essentially of said solvent and said fatty acid amide.

8. The composition according to claim 7, further containing an auxiliary thickening agent.

9. The composition according to claim 6, which consists essentially of said solvent and said fatty acid amide.

10. The composition according to claim 9, further containing an auxiliary thickening agent.

* * * * *

UNITED STATES PATENT AND TRADEMARK OFFICE
CERTIFICATE OF CORRECTION

PATENT NO. : 6,887,921 B2
DATED : May 3, 2005
INVENTOR(S) : Hideaki Asami et al.

It is certified that error appears in the above-identified patent and that said Letters Patent is hereby corrected as shown below:

Column 1,
Line 60, "follower," should read -- followers, --.

Column 2,
Line 31, "combination" should read -- combinations --.

Column 3,
Line 1, "amide" should read -- amides --.

Column 4,
Line 59, "also may cause" should read -- also may avoid --.

Column 5,
Line 65, "4.3" should read -- 43 --.

Column 8,
Line 2, "a" should be deleted;
Line 22, "—(CH$_2$)—" should read -- —(CH$_2$)$_n$— --; and
Line 23, "8" should read -- 8, --.

Signed and Sealed this

Sixth Day of September, 2005

JON W. DUDAS
*Director of the United States Patent and Trademark Office*